2,986,587

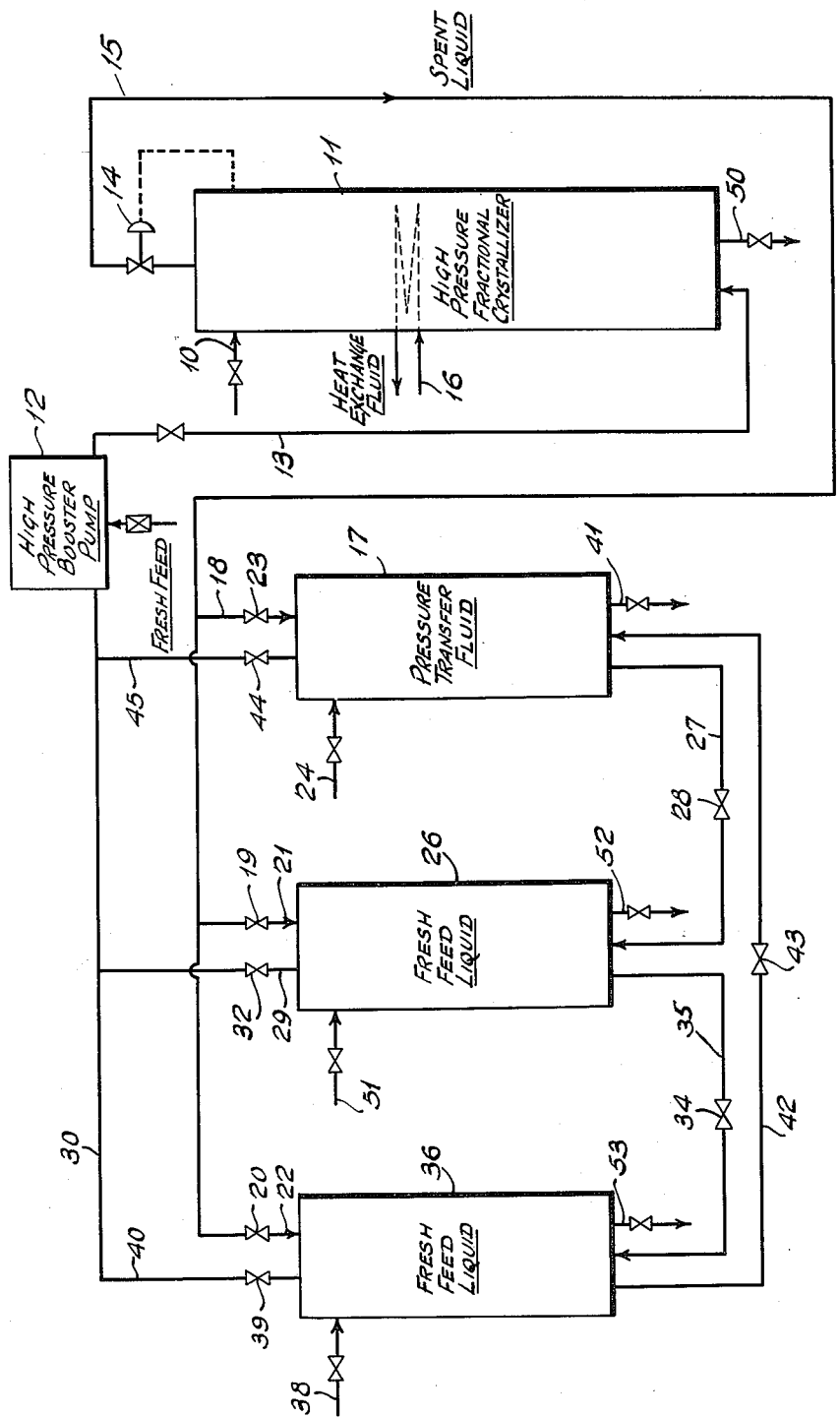

Patented May 30, 1961

2,986,587

METHOD AND APPARATUS FOR HIGH PRESSURE FRACTIONAL CRYSTALLIZATION

Howard V. Hess, Glenham, and Charles A. Coghlan, Beacon, N.Y., assignors to Texaco Inc., a corporation of Delaware Filed Aug. 11, 1954, Ser. No. 449,240

7 Claims. (Cl. 260—674)

This invention relates to a method and apparatus for the recovery and utilization of energy in a high pressure fluid. In one of its embodiments this invention is particularly applicable to a high pressure fractional crystallization operation wherein a fresh feed liquid containing a material to be separated therefrom by fractional crystallization is subjected to elevated pressure during crystallization. More particularly, in its preferred embodiment this invention relates to an improved method for the high pressure fractional crystallization of a petroleum fraction containing para-xylene in admixture with other isomeric xylenes for the recovery of para-xylene therefrom.

In the copending, co-assigned patent application Serial No. 437,790, filed June 18, 1954, in the name of Howard V. Hess, now U.S. Patent 2,816,938, one of the co-inventors of this invention, there is disclosed a process for the high pressure fractional crystallization of liquid mixtures. In accordance with the disclosures of the above-referred patent application, as exemplified by the recovery of para-xylene from a petroleum fraction containing the same, a liquid petroleum fraction is subjected to a substantial elevated pressure, such as in the range 25,000–50,000, and higher, and the temperature of the resulting pressurized liquid petroleum fraction adjusted so as to precipitate or crystallize at least a portion of the para-xylene content thereof. Spent liquid at a relatively high pressure and having a reduced para-xylene content is recovered from the high pressure fractional crystallization zone. A substantial amount of the operating cost of the above-referred high pressure fractional crystallization operation is due to the energy requirements necessary to bring the fresh feed liquid petroleum fraction to the operating pressures maintained in the crystallizer. In order to reduce the energy requirements and operating costs of the above-described operation it would be desirable to recover and/or utilize the energy content of the high pressure spent liquid as represented by its high pressure.

It is an object of this invention to provide an improved process for the high pressure fractional crystallization of a liquid mixture of materials.

It is another object of this invention to provide an improved process of high pressure fractional crystallization wherein the energy requirements, as represented by the energy necessary to inject and maintain a fresh feed liquid undergoing fractional crystallization at the operating pressures required for the high pressure fractional crystallization operation, are reduced and/or held to a minimum.

It is another object of this invention to provide an improved process for the high pressure fractional crystallization of a para-xylene containing petroleum fraction for the recovery of para-xylene therefrom.

These and other objects of this invention and how they are accomplished will become apparent with reference to the accompanying disclosure and drawing which schematically illustrates a high pressure fractional crystallization process in accordance with this invention.

Briefly, we have discovered that the energy requirements of a high pressure fractional crystallization operation are substantially reduced and in some instances held to a minimum and an improved operation obtained by employing the relatively high pressure spent liquid (mother liquor) issuing from the high pressure fractional crystallization zone to pressurize additional fresh feed liquid mixture prior to introduction of the same into the high pressure fractional crystallization zone. The spent liquid issuing from the high pressure fractional crystallization zone will be substantially at the same pressure, although somewhat less than, as the pressure maintained within the high pressure fractional crystallization zone. In accordance with this invention the energy in the spent liquid issuing from the high pressure fractional crystallization zone, as represented by its relatively high pressure, is employed in such a manner that this energy is imparted to additional fresh feed liquid prior to its injection or introduction into the high pressure fractional crystallization zone.

The practice of our invention and the benefits to be derived therefrom will become obvious with reference to the accompanying drawing. Referring now to the drawing, there is schematically illustrated therein a practice of our invention as applied to the high pressure fractional crystallization of a petroleum fraction containing para-xylene for the crystallization of para-xylene therefrom. In the practice of our invention, to be described hereinafter with reference to the high pressure fractional crystallization of a normally liquid petroleum fraction containing para-xylene, it is mentioned that our invention is not limited thereto, but rather is applicable to any high pressure fractional crystallization operation. Indeed, it is mentioned that the practice of our invention is applicable to any system or operation wherein liquid is injected into and maintained at a substantially high pressure within a vessel and wherein there continuously issues from this vessel a relatively high pressure liquid such as a liquid at substantially the pressure which is maintained within said vessel.

Exemplary of the practice of this invention, a liquid petroleum fraction having a composition in the range:

| Component— | Volume Percent |
|---|---|
| Ortho-xylene | 0–30 |
| Meta-xylene | 5–70 |
| Ethylbenzene | 0–20 |
| Para-xylene | 10–40 |
| Saturated hydrocarbons | 0–50 | is introduced via valved conduit 10 into a high pressure fractional crystallizer 11 to completely fill the same. After crystallizer 11 has been completely filled with a fresh feed liquid of the above-referred composition, additional fresh feed liquid is injected thereinto by means of pump 12 via conduit 13. The operating pressure, such as a pressure of about 50,000 p.s.i.g., is maintained within crystallizer 11 by means of pump 12 in cooperation with a pressure-flow regulating valve 14 which is positioned in crystallizer discharge conduit 15. By suitably adjusting the pumping rate of pump 12 and/or the opening of valve 14 the pressure within crystallizer 11 can be readily maintained at any desired pressure. As the fresh feed liquid mixture is injected into crystallizer 11 via conduit 13 the temperature of the fresh feed liquid within the crystallizer 11 is adjusted to suitable operating value by means of heat exchanger 16 so as to cause precipitation of at least a portion of the para-xylene content of the fresh feed liquid mixture. As a result there issues from crystallizer 11 via valve 14 and conduit 15 a spent liquid or mother liquor having a reduced para-xylene content still substantially at the same pressure but somewhat lower than the pressure of the liquid within crystallizer 11. For example, the pressure of the spent liquid in conduit 15 may be in the range of 40,000–49,000 p.s.i.g. depending upon the operating conditions employed. The high pressure spent liquid in conduit 15 is introduced into pressure transfer fluid vessel 17 via conduit 18, valves 19 and 20 in conduits 21 and 22, respectively, being closed. Prior to the injection or introduction of the high pressure spent liquid via conduit 18 and valve 23 into the pressure transfer fluid vessel 17, vessel 17 is filled with a suitable pressure transfer fluid via valved conduit 24.

A suitable pressure transfer fluid, in accordance with the practice of our invention, is any substantially incompressible fluid, such as water. It is preferred in the practice of this invention that pressure transfer fluid employed in vessel 17 be substantially immiscible with and more dense than the spent liquid issuing from crystallizer 11 and substantially immiscible with and more dense than the fresh feed liquid also being introduced into crystallizer 11. Suitable pressure transfer fluids include the normally liquid halogen-substituted aliphatic hydrocarbons, and the oxygenated hydrocarbons, such as methanol, ethyl alcohol, aldehydes, etc. With valves 19 and 20 closed and valve 23 open, as indicated hereinabove, the spent liquid flows in conduits 15 and 18 into communication with the pressure transfer fluid, such as water, within the pressure transfer vessel 17. As a result of this relationship the pressure transfer fluid is pressured to substantially the same pressure as that of the spent liquid in communication therewith. The pressure transfer vessel 17 in turn is in fluid communication with a fresh feed liquid container 26, which has previously been filled with fresh feed liquid via valved conduit 51, via conduit 27, valve 28 being open. As a result the fresh feed liquid within the container 26 is likewise pressured to substantially the same pressure that exists within pressure transfer vessel 17. In turn the fresh feed liquid container 26 is in fluid communication with the intake of pressure booster pump 12 via conduits 29 and 30, valve 32 being open. As a result of the above operation and conditions it is seen that the pressure of the spent liquid in conduit 15 is transferred in turn to the pressure transfer fluid contained in transfer vessel 17 and then in turn to the fresh feed liquid in container 26 which in turn supplies fresh liquid to the intake of pump 12 via conduits 29 and 30.

After a period of time it will be obvious that pressure transfer vessel 17 will be filled with spent liquid and the pressure transfer fluid (water) originally present in the pressure transfer vessel 17 will have been transferred to fresh feed liquid container 26 to substantially completely fill the same. When this condition is attained, and in order to carry out and continue the high pressure fractional crystallization on a substantially continuous basis, valves 23 and 28 are closed and valve 19 in conduit 21 is opened so that the spent liquid in conduit 15 is introduced directly into container 26. In turn, valve 34 in conduit 35 is opened and communicates container 26 with a fresh feed liquid container 36, which has previously been filled with fresh feed liquid via valved conduit 38. The pressure of the spent liquid in conduit 15 is now transferred to the pressure transfer fluid (water) in container 26 which in turn transmits this pressure via conduit 35 to the fresh feed liquid present in container 36. Valve 39 in conduit 40 being open, the fresh feed liquid in container 36 is accordingly forced via conduit 40 into conduit 30 to the intake of pump 12 where the pressure of the fresh feed liquid is boosted to the operating pressure maintained in crystallizer 11.

After the period of operation it will be apparent container 36 will be filled with the pressure transfer fluid (water) and container 26 will be filled with spent liquid. When this condition is reached valves 19 and 34 are closed and valve 20 is opened so that the spent liquid in conduit 15 is directly introduced into container 36 via valve 20 and conduit 22. In the meantime the vessel 17 shall have been emptied of spent liquid via valved conduit 41, containers 26 and 36 being provided with valved conduits 52 and 53, respectively, for a similar purpose, and recharged with additional fresh feed mix via valved conduit 24. When the above-indicated operations have been accomplished the pressure of the spent liquid within conduit 15 is transferred via valve 20 and conduit 22 to the pressure transfer liquid within container 36 which in turn transfers this pressure via conduit 42 and valve 43 to the fresh feed liquid within the vessel 17. The pressured fresh feed liquid within vessel 17 in turn flows via valve 44 and conduit 45 into conduit 30 to the intake of pump 12. It will readily be apparent in view of the foregoing that when container 36 is substantially filled with spent liquid, vessel 17 shall then be substantially completely filled with the pressure transfer fluid and the originally described condition of operation shall have been reached.

The above operations are carried out in sequence in a substantially continuous manner until crystallizer 15 shall have been filled with the desired amount of crystallized product, e.g. para-xylene. When this condition is reached the injection of fresh feed liquid into crystallizer 11 via pump 12 and conduit 13 is halted and the crystallized product within crystallizer 15 melted by heat exchanger 16 and removed through valved conduit 50. Subsequently crystallizer 11 can again be completely filled with additional fresh feed liquid via valved conduit 10 and the high pressure fractional crystallization operation as above described continued.

In the drawing we have indicated the introduction of the spent liquid in conduit 15 into vessel 17 and containers 26 and 36 as taking place at the top thereof. This manner of introduction is particularly desirable in the practice of our invention as applied to the separation of petroleum fractions, such as a petroleum fraction containing para-xylene, and wherein the pressure transfer fluid employed is water. This manner of introduction of the spent liquid into vessel 17 and containers 26 and 36, in sequence, is desirable when these elements are filled with a pressure transfer fluid which has a density greater than the density of the spent liquid introduced thereinto. When a pressure transfer fluid is employed which is less dense than the spent liquid, the spent liquid is advantageously introduced into the bottom of these containers rather than at the top. The necessary re-arrangements of the conduits, etc. under such conditions are obvious in view of the foregoing disclosure.

While we have described our invention with reference to a particular preferred embodiment directed to the high pressure fractional crystallization of para-xylene from a petroleum fraction containing the same and employing water as a pressure transfer fluid, it is emphasized that other pressure transfer fluids are possible such as any normally hydrocarbon insoluble liquid. It is also emphasized that the pressure transfer fluid need not be completely immiscible with the spent liquid and the fresh feed liquid provided conditions are maintained within the vessel and containers such that substantial mixing or intermingling of the pressure transfer fluid employed and the other liquids (fresh feed liquid and spent liquid) in contact therewith is avoided.

The high pressure fractional crystallizer 11 may be operated at any substantial elevated pressure, such as at least 2,000 p.s.i.g. Usually a pressure in the range 10,000–100,000 p.s.i.g. is suitable to be maintained within crystallizer 11. Other liquid mixtures which may be separated in accordance with the practice of our invention are those mixtures of organic compounds, such as close boiling organic compounds, which are difficultly separable by conventional means, e.g. fractional distillation, and include liquid mixtures of alkyl-substituted pyridine compounds, e.g. the picolines and lutidines, amino-substituted benzene compounds, e.g. the toluidines and xylidines, isomeric hydroxy-substituted benzene derivatives, e.g. ortho-, meta- and para-cresols, the xylenols and nitro-substituted benzene derivatives.

As will be apparent to those skilled in the art in the light of the foregoing disclosure, many substitutions and modifications are possible without departing from the spirit and scope of this invention.

We claim:

1. In the method of fractional crystallization wherein a fresh feed liquid containing a material to be separated therefrom by fractional crystallization is subjected to an elevated pressure of at least 2000 p.s.i.g. within a high pressure fractional crystallization zone to effect crystallization of said material, the improvement which comprises recovering from said high pressure fractional crystallization zone a spent liquid having a reduced proportion of said material with respect to said fresh feed liquid at a pressure somewhat lower than the pressure maintained in said high pressure crystallization zone, introducing said spent liquid into a pressure transfer zone filled with a pressure transfer liquid said pressure transfer liquid being substantially immiscible with and more dense than said fresh feed liquid and said spent liquid, whereby said pressure transfer liquid is pressurized by direct contact with said spent liquid to substantially the same pressure as said spent liquid, pressurizing additional fresh feed liquid with said pressurized transfer liquid by direct contact therewith, then raising the so pressurized additional fresh feed liquid at least to the elevated pressure of said fractional crystallization zone, and then introducing said additional fresh feed liquid into said high pressure fractional crystallization zone whereby at least part of the energy in said spent liquid is recovered.

2. The method in accordance with claim 1 wherein said fresh feed liquid is a hydrocarbon fluid containing para- and meta-xylene, and wherein said material separated by fractional crystallization is para-xylene.

3. The method in accordance with claim 1 wherein said fresh feed liquid is a petroleum fraction having a composition in the range:

| Component— | Volume percent |
|---|---|
| Ortho-xylene | 0–30 |
| Meta-xylene | 5–70 |
| Ethylbenzene | 0–20 |
| Para-xylene | 10–40 |
| Saturated hydrocarbons | 0–30 | and wherein said pressure transfer liquid is water.

4. The method in accordance with claim 1 wherein said fresh feed liquid is a liquid mixture of alkyl-substituted pyridine compounds.

5. The method in accordance with claim 1 wherein said fresh feed liquid is a liquid mixture of amino-substituted benzene compounds.

6. A method in accordance with claim 1 wherein said fresh feed liquid is a liquid mixture of isomeric, hydroxy-substituted benzene compounds.

7. A method in accordance with claim 1 wherein said fresh feed liquid is a liquid mixture of nitro-substituted benzene compounds.

References Cited in the file of this patent

UNITED STATES PATENTS

| | | |
|---|---|---|
| 960,729 | Sweeny | June 7, 1910 |
| 2,435,792 | McArdle et al. | Feb. 10, 1948 |
| 2,651,922 | Graham | Sept. 15, 1953 |
| 2,657,230 | Rogers | Oct. 27, 1953 |
| 2,666,019 | Winn et al. | Jan. 12, 1954 |
| 2,680,677 | Broge et al. | June 8, 1954 |
| 2,683,178 | Findlay | July 6, 1954 |

OTHER REFERENCES

Bridgeman: Physical Reviews, vol. 3, No. 3, pages 153–202 (1914) pages 162, 164, 166, 169, 170, 171, 175, 180 and 183 only needed.